Figure 1:
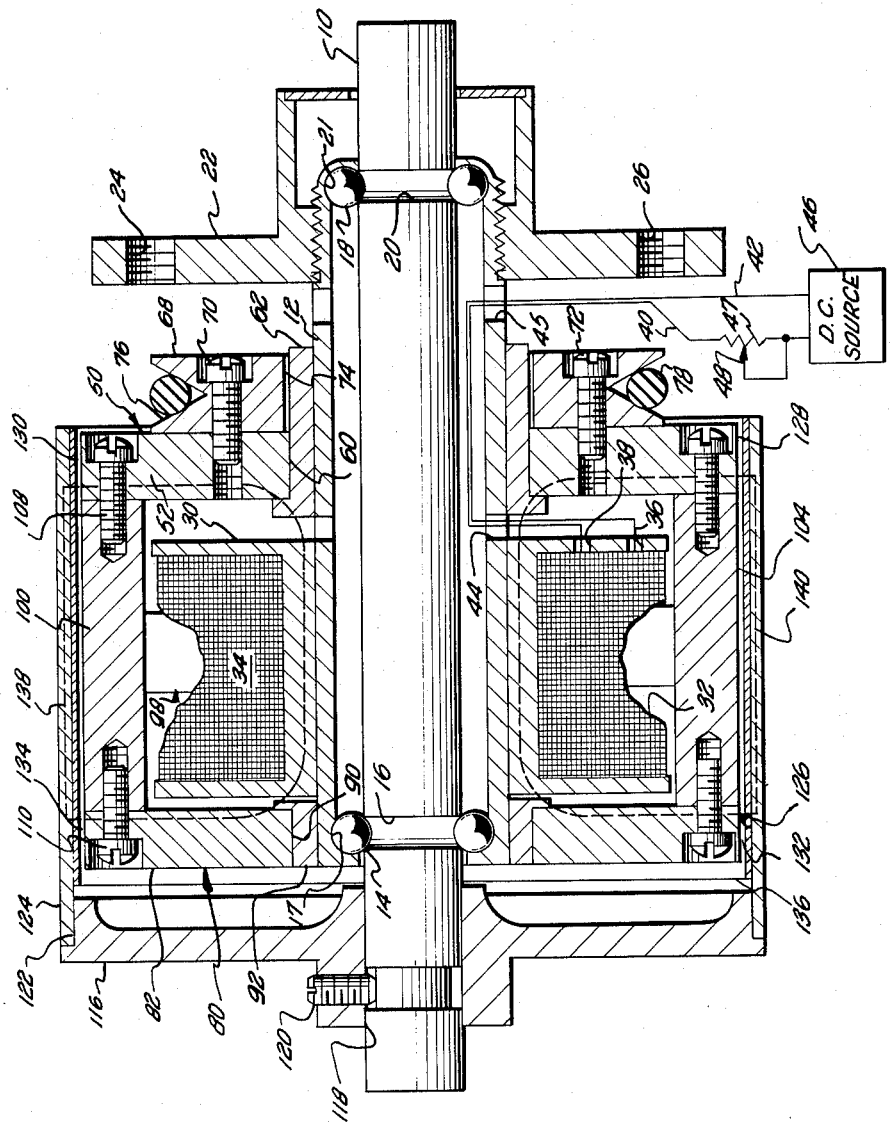

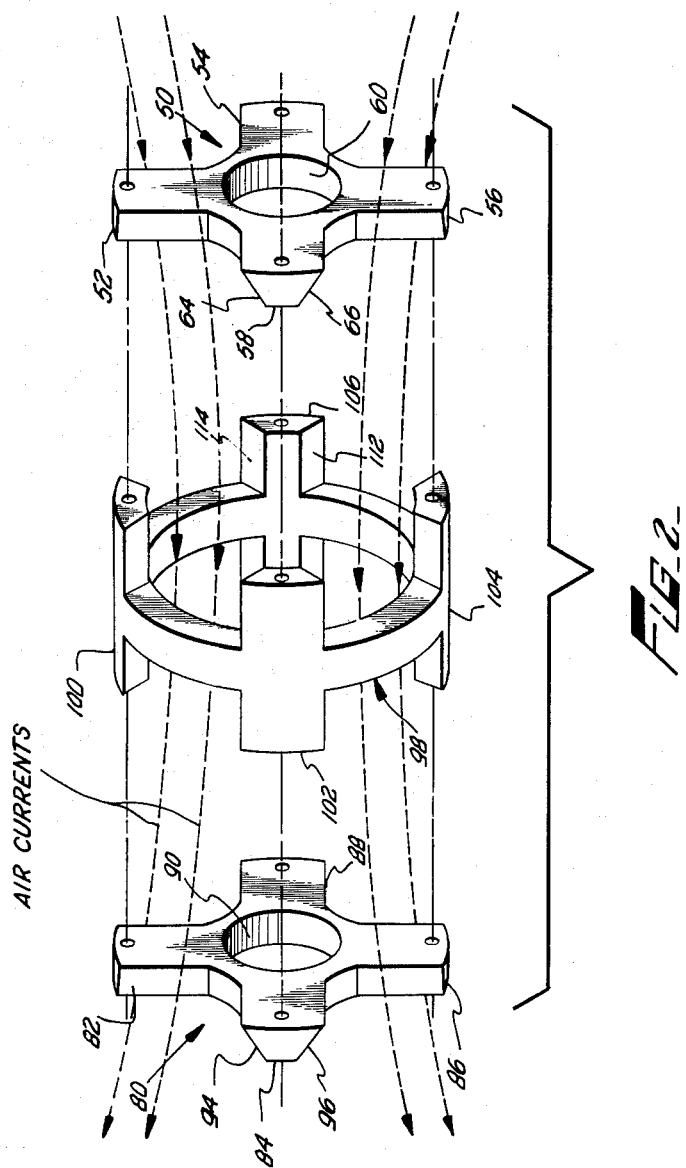

3,233,131
EDDY CURRENT CLUTCH
Charles B. Stegman, 8560 Fullbright Ave.,
Canoga Park, Calif.
Filed June 14, 1962, Ser. No. 202,503
8 Claims. (Cl. 310—105)

The present invention relates to an improved, highly compact, eddy current clutch.

Various types of motor control systems have been developed for selectively positioning or controlling the speed of a given low inertia body. Generally such systems employ means for developing a control signal responsive to the position or speed of the body and a motor drive unit responsive to the control signal for selectively controlling the position or speed of the body. The accuracy of the control provided by such a system is a direct function of the accuracy of the motor drive unit. Motor drive units which are sensitive to small changes in a control signal applied thereto to produce a proportional change in the rotational output are critical in design and manufacture and are relatively expensive.

In order to provide an accurate motor control system at a reduced cost, systems have been developed which employ an electromagnetic clutch in combination with the motor drive unit and the low inertia body. In such systems the motor drive unit, which may be a constant speed motor of inexpensive design, is coupled to the drive member of the clutch while the low inertia body is coupled to the driven member of the clutch. To then regulate the position or speed of the low inertia body the control signal is applied to the electromagnetic clutch to control the degree of slippage between the drive and driven members.

Electromagnetic clutches for providing relatively proportional control of the position or speed of a low inertia body in response to a control signal are of two general types, namely, friction clutches and eddy current clutches. In friction clutches the drive and driven members are in rotating friction contact, the degree of friction being controlled by the control signal. Due to the wearing friction associated with electromagnetic friction clutches, such clutches are unsuited for control systems requiring continuous control over long periods of time.

Eddy current clutches, on the other hand, provide substantially proportional control of the position or speed of a low inertia body coupled thereto in response to a control signal applied to the clutch. In addition, eddy current clutches do not include friction wearing surfaces to provide control of its driven member. In the past, however, eddy current clutches have been bulky in design, difficult to manufacture, and subject to cooling problems. In addition, the expense of eddy current clutches has been such as to render the overall control system at least as expensive as the conventional motor control systems previously described.

In view of this, the present invention provides an eddy current clutch design which is compact, easy to manufacture, and substantially less expensive than clutches heretofore developed. The eddy current clutch of the type disclosed is particularly useful for low torque applications as encountered in magnetic tape recorders and reproducers, small machine tools, business machines and the like. In addition, cooling means are built into the clutch to prevent over-heating.

To accomplish this eddy current clutch of the present invention, in a basic form, includes a fixed coil assembly bearing mounted concentrically around a shaft member. Coaxially bearing means mounted around the shaft member at opposite sides of the coil assembly to extend radially beyond the coil are first and second pole carrying members of magnetic material. Coupled between portions of the pole carrying members extending radially beyond the coil assembly are a plurality of link members. The link members are composed of a non-magnetic material and have opposing radial faces which are inwardly tapered toward the shaft member to define a plurality of fan blades or impeller bars for rotation with the pole carrying members to cool the coil assembly regardless of the direction of rotation. Fixedly coupled for rotation with the shaft and concentric therewith is a hollow driven member of magnetic material. The hollow driven member extends around the coil assembly and provides an inner surface adjacent the outer surface of the pole carrying members to define air gaps between the pole members and the driven member. Carried by the inner surface of the hollow driven member and extending within the air gaps are means defining conductive surfaces between the pole members and the driven member. Coupled to the coil assembly are adjustable means for applying a controllable direct current signal to the coil assembly while coupled to the first and second pole carrying members are drive means for rotating the pole members around the shaft.

When the coil assembly is energized, a magnetic field is set up having a flux path which links the pole members and the driven member through the air gaps. Rotation of the pole members produces a rotating magnetic field which, in turn, induces eddy currents in the conductive surfaces associated with the driven member. The eddy currents produce a force on the driven member to cause a rotation of the driven member and the shaft which follows the rotation of the pole members.

Control of the direct current signal applied to the coil assembly controls the strength of the magnetic field to vary the force on the driven member. In this manner the torque output of the driven member and shaft is selectively controlled by the magnitude of the direct current signal applied to the coil assembly.

Due to the concentric nature of the design of the present invention, the eddy current clutch is extremely simple to manufacture and may be highly compact. In addition, as described, the magnetic flux path only includes a minimum number of magnetic elements which materially reduces the overall cost of manufacturing the eddy current clutch.

The above, as well as other features of the present invention, may be more clearly understood by reference to the following detailed description when considered with the drawings, in which:

FIGURE 1 is a cross-sectional representation of a preferred form of the eddy current clutch; and FIGURE 2 is an exploded perspective of one form of the pole carrying members and cooling arrangement of the present invention.

As represented in FIGURE 1, the eddy current clutch of the present invention includes a shaft member 10. Concentrically disposed around the shaft member is a tubular member 12. The tubular member 12 may be composed of steel and is bearing mounted for substantially free rotation around the shaft 10 by a pair of bearing arrangements. The first bearing arrangement includes a plurality of ball bearings 14 mounted around the shaft 10 and disposed in an annular groove 16. The ball bearings make rolling contact with a curved inner surface 17 at one end of the tubular member 12.

The second bearing arrangement includes a plurality of ball bearings 18 which are mounted around the shaft 10 and disposed within an annular groove 20. The ball bearings 18 contact a curved inner surface 21 at an end of the tubular member 12 remote from the ball bearings 14.

As illustrated, the curved portions 17 and 21 of the tubular member 12 substantially enclose the portion of the shaft 10 extending within the tubular member 12. This prevents dust, lint, and other foreign matter from contacting the ball bearings and interfering with the free rotation of the tubular member 12 relative to the shaft 10.

The shaft 10 and the tubular member 12, together with the ball bearing arrangements 14 and 18, form a single unit which is commercially available and manufactured by the Hartford Steel Ball Company, Inc. of Hartford, Connecticut.

The outer circumferential surface of the tubular member 12 adjacent the ball bearing arrangement 18 is threaded to receive a mounting plate 22. The mounting plate 22 includes a plurality of threaded holes such as 24 and 26 to provide means for coupling the mounting plate 22 to supporting structure (not shown). In this manner the mounting plate 22 provides means for supporting the eddy current clutch of the present invention.

Extending tightly around the tubular member 12 is a bobbin member 30 composed of a magnetic material such as steel. The bobbin member 30 carries a coil represented as 32. The coil 32 and bobbin 30 form a coil-bobbin assembly 34, which, due to the tubular member 12, is concentrically bearing mounted around the shaft 10.

The bobbin 30 includs a pair of openinges 36 and 38 for receiving conductors 40 and 42. The conductors 40 and 42 are connected to opposite ends of the coil 32 and extend through openings 44 and 45 in the tubular member 12 to a direct current source 46. The conductor 42 is coupled directly to the direct current source 46 while the conductor 40 is coupled to a variable resistor 47 and hence to the direct current source. The current signal from the direct current source 46 is carried by the leads 40 and 42 to the coil 32, to energize the coil thereby producing a magnetic field having a predetermined flux path, as will be hereinafter described. By controlling the position of the movable arm 48 associated with the variable resistor 47, the magnitude of the current applied to the coil 32 is controlled to control the strength of the magnetic field developed by the coil-bobbin assembly 34.

Positioned to one side of the coil-bobbin assembly 34 is a pole carrying member 50. The pole carrying member 50 is composed of a magnetic material and supports a plurality of pole members. For example, as illustrated in FIGURE 2, pole carrying member 50 is shaped to define pole members 52, 54, 56 and 58. As represented, the pole members 52, 54, 56 and 58 are equally spaced from each other around, and extend radially from, an opening 60 which is centrally disposed in the pole carrying member 50.

The pole carrying member 50 is mounted around the shaft 10 by means of a flanged bearing arrangement 62 which extends around the tubular member 12 within the opening 60. The bearing arrangement 62 is stationary and allows the pole carrying member 50 to rotate freely therearound. This prevents oil from being thrown from the bearing arrangement as would occur if the bearings were free to rotate with the pole carrying member 50. The bearing arrangement 62, thus formed, may be composed of the bearing material Oilite and concentrically mounts the pole carrying member 50 such that each of the pole members extend radially from the shaft 10 to a point beyond the coil-bobbin assembly 34.

Preferably, the pole members 52, 54, 56 and 58 are each shaped to define a fan blade for cooling the coil-bobbin assembly 34. By way of illustration only, the opposing radial surfaces of the pole members, such as 64 and 66 of the pole member 58, are tapered toward the coil-bobbin assembly 34. In this manner, a rotation of the pole carrying member 50 relative to the coil-bobbin assembly 34 draws air from between the pole members toward the coil-bobbin assembly to provide a cooling thereof. This is independent of the direction of rotation of the pole carrying member.

To provide driving rotation for the pole carrying member 50, a drive plate 68, as illustrated in FIGURE 1, is coupled by a plurality of screw members such as 70 and 72, to the pole carrying member 50. The drive plate 68 includes an opening 74 which is centrally disposed therein and provides means for mounting the drive plate around the bearing arrangement 62 slightly spaced therefrom. Thus, the drive plate 68 is free to rotate with the pole carrying member 50 around the shaft 10. The outer surface of the drive plate includes a V-shaped slot 76 for receiving a belt 78. The belt 78 is coupled to the shaft of a motor (not shown) for rotating the drive plate 68. Thus, the drive plate 68, together with the belt 78, forms a pulley arrangement which, in response to rotation of the motor drive, rotates the pole carrying plate 50 about the shaft 10.

Positioned on an opposite side of the coil-bobbin assembly 34 is a pole carrying member 80. The pole carrying member 80 is composed of a magnetic material and similar to the pole carrying member 50 supports a plurality of pole members. For example, as illustrated in FIGURE 2, the pole carrying member 80 is shaped to define pole members 82, 84, 86 and 88. As represented, the pole members 82, 84, 86 and 88 are equally spaced from each other around, and extend radially from, an opening 90 which is centrally disposed in the pole carrying member 80.

The pole carrying member 80 is mounted around the shaft by means of a flanged bearing arrangement 92 which extends around the tubular member within the opening 90. The bearing arrangement 92, like the bearing arrangement 62, is stationary and allows the pole carrying member 80 to rotate freely therearound. The bearing arrangement 92 thus formed may be composed of Oilite and concentrically mounts the pole carrying member 80 such that the pole members thereof extend radially from the shaft 10 to a point beyond the coil-bobbin assembly 34.

Similar to the pole members supported by the pole carrying member 50, the pole members of the pole carrying member 80 are preferably shaped to define a plurality of fan blades for cooling the coil-bobbin assembly 34. By way of illustration only, the opposing radial surfaces of the pole members, such as 94 and 96 of the pole member 84, are tapered toward the coil-bobbin assembly 34. In this manner, a rotation of the pole carrying member 80 relative to coil-bobbin assembly 34 draws air from between the pole members toward the coil-bobbin assembly to provide a cooling thereof. This is independent of the direction of rotation of the pole carrying member 80.

Extending around the coil-bobbin assembly 34 concentric with the shaft 10 is a ring member 98 composed of a non-magnetic, non-metallic material such as Bakelite, fiberglass, or other plastic-like material. The ring member 98, as most clearly illustrated in FIGURE 2, carries a plurality of link members 100, 102, 104 and 106. The link members are equally spaced around the ring member 98 and extend longitudinally along the shaft 10 between the portions of the pole members supported by the pole carrying members 50 and 80 which extend radially beyond the coil-bobbin assembly 34. The link members are each coupled by a pair of screw members, such as 108 and 110, to a pair of pole members, such as 52 and 82, which are supported by the pole carrying members 50 and 80, respectively. In this manner the pole carrying members 50 and 80 provide support for the ring member 98 which in turn locks the pole carrying members together to rotate concentrically and in unison around the shaft 10 in response to driving rotation of the drive plate 68.

As illustrated most clearly in FIGURE 2, the link members are each shaped to define a fan blade for cooling the coil-bobbin assembly 34. For example, the opposing radial surfaces of each link member, such as 112 and 114 of link member 106, are inwardly tapered toward the shaft 10. Thus, the link members, in rotating with the pole carrying members 50 and 80, aid the pole members in circulating air around the coil-bobbin assembly 34 to provide a cooling of the coil 30 independent of the direction of rotation of the drive plate 68.

To complete the structure of the eddy current clutch, a drive plate 116 is positioned at a side of the clutch remote from the drive plate 68. The driven plate 116 includes a central opening 118 for receiving the shaft 10. The driven plate 116 is pinned to the shaft 10, as illustrated at 120, and extend radially therearound beyond the outer surface of the pole members supported by the pole carrying members 50 and 80. The outer surface of the driven plate 116 includes an annular recess 122.

Supported by the driven plate 116 within the annular recess 122 is a tubular cylinder 124 of magnetic material. The cylinder or sleeve 124 thus extends concentrically around the shaft 10 and the coil-bobbin assembly 34. An inner surface 126 of the cylinder 124 extends adjacent outer surfaces of the pole members supported by the pole carrying members 50 and 80 to define a plurality of air gaps such as 128, 130, 132 and 134 between the cylinder 124 and the pole members 52 and 82 supported by the pole carrying members 50 and 80, respectively.

Pressure fitted to the inner surface 126 of the cylinder 124 is an inner sleeve or cylinder 136 of conductive material such as copper. The cylinder 136 extends around the inner surface of the cylinder 124 and provides a conductive surface within the air gaps extending between the cylinder 124 and the pole members supported by the pole carrying plates 50 and 80.

Briefly, in operation, a direct current signal from the direct current source 44 is applied to the coil-bobbin assembly 34. The current applied to the coil 32 produces a magnetic field having flux paths which extend through and are concentrated within the pole members supported by the pole carrying members 50 and 80. For example, the flux paths including the pole members 52 and 82 are represented in FIGURE 1 by the dotted line loops 138 and 140. Rotation of the pole carrying members 50 and 80 in response to rotational driving movement of the drive plate 68, produces a rotation of the magnetic field with the pole members relative to the cylinder 136 of conductive material. Due to the rotation of the magnetic field eddy currents are induced in the cylinder 136 in the regions adjacent the pole members. The eddy currents, in turn, produce a force on the cylinder 136 in a direction of rotation of the magnetic field causing the cylinder 136 to rotate in the direction of the rotating magnetic field carrying with it the cylinder 124, the driven plate 116 and the shaft 10.

In this manner rotary movement of the drive plate 68 produces a following rotation of the driven plate 116 and the shaft 10 to drive a low inertia body coupled to the shaft or to the driven plate 116.

By varying the magnitude of the current supplied by the direct current source 44 through movement of the variable arm 48, the strength of the magnetic field produced by the coil-bobbin assembly 34 is selectively controlled. Control of the magnetic field in turn produces a controlled variation in the force on the cylinder 136 to control the torque transfer characteristic of the eddy current clutch. Thus, the rate at which the shaft 10 rotates to drive a load member coupled thereto may be selectively controlled in response to the magnitude of current flowing through the coil 32.

As current flows through the coil 32 heat is generated in the coil-bobbin assembly 34. Rotation of the pole carrying members 50 and 80, however, carries the link members around the coil-bobbin assembly 34 to pass air into and out of contact with the coil 32. This provides a cooling action in the clutch to prevent excessive heating of the coil-bobbin assembly.

As described, the eddy current clutch of the present invention is formed of a plurality of magnetic and non-magnetic members arranged concentrically around the central shaft 10. Due to this arrangement, the eddy current clutch of the present invention is extremely simple to machine and construct. Also, the concentric arrangement of the elements comprising the eddy current clutch allows the clutch to be extremely compact in design and to utilize a minimum number of magnetic elements to form the closed magnetic path for inducing eddy currents in the conductive cylinder 136.

In addition, the concentric arrangement of the outer cylinders 124 and 136, together with the placement of the pole carrying members 50 and 80, allows the eddy current clutch to include link elements between the pole carrying members which provide a fan cooling action for the centrally disposed coil-bobbin assembly 34 as the pole carrying members rotate around the central shaft 10.

In this manner the present invention provides an eddy current clutch design which is compact, easy to manufacture, relatively inexpensive, and free of excessive heating problems.

What is claimed is:
1. An eddy current clutch, comprising:
a shaft member;
a coil assembly bearing mounted around the shaft member;
a first pole carrying member of magnetic material having a central opening therein and supporting a plurality of pole members extending radially outward from the central opening;
bearing means extending around the shaft member within the central opening of the first pole carrying member for mounting the first pole carrying member coaxially around the shaft member at one side of the coil assembly;
a second pole carrying member of magnetic material having an opening centrally disposed therein and supporting a plurality of pole members extending radially outward from the central opening;
bearing means extending around the shaft within the central opening of the second pole carrying member to mount the second pole carrying member coaxially around the shaft member at an opposite side of the coil assembly;
a hollow driven member of magnetic material coaxially mounted for rotation with the shaft member and extending an inner surface adjacent an outer surface of the pole members supported first and second pole carrying members to define air gaps between the hollow driven member and the pole members;
means carried by the inner surface of the hollow driven member and defining a conductive surface between the inner surface of the hollow driven member and the outer surfaces of the pole members within the air gaps;
and drive means for rotating the first and second pole carrying members around the shaft member to produce a rotation of the hollow driven member.

2. An eddy current clutch of the character referred to including, an elongate tubular support member, an elongate shaft rotatably carried by the support member concentric therewith, a coil assembly arranged concentrically about said support member in fixed relationship thereto, a pair of pole members arranged to occur at opposite ends of the coil assembly into concentric axial spaced relationship about said support member for free rotation relative to the support member and the coil assembly, each pole member having a plurality of circumferentially spaced radially outwardly projecting pole pieces, longitudinally extending, non-magnetic coupling means fixed to and extending between the pole pieces and arranged to occur radially outward of the coil assembly, an elongate tubular drive member of magnetic material coupled with the shaft for rotation therewith and arranged about the pole members to extend longitudinally therebetween and about the coil assembly and cooperating with the pole pieces to define air gaps between said pole pieces and the driven member, an inner sleeve of conductive material carried by the driven member and defining a conductive surface within the air gaps and between the driven member and the pole pieces, drive means for rotating the pole members relative to the coil assembly and the drive members and means for applying a direct current signal to the coil assembly.

3. A structure as set forth in claim 2 wherein at least one of said pole pieces is fan-shaped with the circumferentially spaced radially outwardly projecting pole pieces thereof shaped and disposed so as to induce a flow of coolant air axially through the driven member and about the coil assembly.

4. A structure as set forth in claim 2 wherein said axially spaced pole members are fan-shaped with the radially outwardly projecting pole pieces thereof shaped and disposed so as to impel coolant air axially into and about the driven member and coil assembly at one end of the construction and draw said air out of and from about said driven member and coil assembly at the other end of the construction.

5. A structure as set forth in claim 2 wherein said pole members are alike with related pole pieces in common longitudinally extending radial planes, said coupling means including elongate longitudinally extending and circumferentially spaced bars of non-magnetic material fixed to and extending between related pairs of pole pieces.

6. A structure as set forth in claim 2 wherein said pole members are alike with related pole pieces in common longitudinally extending radial planes, said coupling means including elongate longitudinally extending and circumferentially spaced bars of non-magnetic material fixed to and extending between related pairs of pole pieces, said bars being shaped and disposed to define impellers and to draw coolant air axially into the driven member and to urge said coolant air radially inwardly about the coil assembly, between said pole members.

7. A structure as set forth in claim 2 wherein said pole members are alike with related pole pieces in common longitudinally extending radial planes, said coupling means including elongate longitudinally extending and circumferentially spaced bars of non-magnetic material fixed to and extending between related pairs of pole pieces, the pole pieces of the pole member at one end of the driven member being shaped and disposed to define impellers and to urge coolant air axially into the driven member, said bars being shaped and disposed to define impellers and to urge said coolant air radially inwardly about the coil assembly.

8. A structure as set forth in claim 2 wherein said pole members are alike with related pole pieces in common longitudinally extending radial planes, said coupling means including elongate longitudinally extending and circumferentially spaced bars of non-magnetic material fixed to and extending between related pairs of pole pieces, the pole pieces of the pole member at one end of the driven member being shaped and disposed to define impellers and to urge coolant air axially into the driven member, said bars being shaped and disposed to define impellers and to urge said coolant air radially inwardly about the coil assembly, said pole pieces of the pole member at the other end of the driven member being shaped and disposed to define impellers and to draw said coolant air away from said coil assembly and out of the driven member.

References Cited by the Examiner

UNITED STATES PATENTS

| 1,271,401 | 7/1918 | Weydell | 310—106 |
|---|---|---|---|
| 2,447,130 | 8/1948 | Matulaitis et al. | 310—105 |

FOREIGN PATENTS 743,400   1/1956   Great Britain.

MILTON O. HIRSHFIELD, *Primary Examiner.*